(12) United States Patent
Hattori

(10) Patent No.: US 8,472,077 B2
(45) Date of Patent: Jun. 25, 2013

(54) IMAGE PROCESSING METHOD FOR FAST FILL-IN OF A FIGURE AND COMPUTER READABLE MEDIUM THEREFOR

(75) Inventor: Hiroshi Hattori, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 13/615,991

(22) Filed: Sep. 14, 2012

(65) Prior Publication Data

US 2013/0009985 A1  Jan. 10, 2013

Related U.S. Application Data

(62) Division of application No. 12/261,496, filed on Oct. 30, 2008.

(30) Foreign Application Priority Data

Oct. 31, 2007  (JP) .................................. 2007-283215

(51) Int. Cl.
*H04N 1/60* (2006.01)

(52) U.S. Cl.
USPC ......... 358/1.9; 358/1.12; 358/1.18; 358/3.28; 358/540

(58) Field of Classification Search
None
See application file for complete search history.

(56) References Cited

U.S. PATENT DOCUMENTS

| | | | |
|---|---|---|---|
| 5,450,533 A | 9/1995 | Takahashi et al. | |
| 5,455,682 A * | 10/1995 | Ikuta | 358/3.16 |
| 6,121,975 A | 9/2000 | Mungenast et al. | |
| 6,175,424 B1 | 1/2001 | Iino et al. | |
| 6,519,364 B1 * | 2/2003 | Hiraishi | 382/203 |

(Continued)

FOREIGN PATENT DOCUMENTS

| | | |
|---|---|---|
| JP | HEI 2-141883 | 5/1990 |
| JP | 6-309469 | 11/1994 |

(Continued)

OTHER PUBLICATIONS

N2Factory, "Graphics Starting With GDI+, Fully Covering Basic Technique of Image Processing (Middle Chapter, Controlling Various Graphics With Vector Graphics Functions", pp. 97-116, $22^{nd}$ issue, $8^{th}$ vol., dotNET Magazine published by SHOEISHA, Japan, Dec. 1, 2002.

(Continued)

*Primary Examiner* — Dung Tran
(74) *Attorney, Agent, or Firm* — Scully, Scott, Murphy & Presser, P.C.

(57) ABSTRACT

An image processing method includes steps of acquiring a first two-dimensional parallelogram image, creating a second two-dimensional parallelogram image by dividing the first image into two figures by a line along a predetermined scanning direction and joining together respective sides of the two figures corresponding to an upper base and a lower base of the first image, calculating a value w representing a numerical number of pixels constituting an upper base or a lower base of the second image and a value h representing a numerical number of pixels in a height direction of the second image, securing a w×h two-dimensional memory space, writing pixel values on each scanning line of the second image, sequentially in a scanning order, onto a corresponding scanning line of the two-dimensional memory space, and storing supplementary information of the second image in association with the two-dimensional memory space.

8 Claims, 12 Drawing Sheets

U.S. PATENT DOCUMENTS

| | | |
|---|---|---|
| 7,177,452 B2 | 2/2007 | Wong et al. |
| 7,187,467 B2 | 3/2007 | Takahashi et al. |
| 7,714,872 B2 | 5/2010 | Aoki |
| 8,194,279 B2 * | 6/2012 | Ishikawa et al. ............. 358/1.18 |
| 2004/0150856 A1 | 8/2004 | Asai |
| 2005/0019521 A1 | 1/2005 | Yamanaka et al. |
| 2006/0221079 A1 * | 10/2006 | Zhao et al. .................... 345/441 |
| 2008/0007807 A1 * | 1/2008 | Yamada et al. ............... 358/540 |

FOREIGN PATENT DOCUMENTS

| | | |
|---|---|---|
| JP | 8-44881 | 2/1996 |
| JP | HEI 9-190468 | 7/1997 |
| JP | HEI 11-224331 | 8/1999 |
| JP | 2000-82150 | 3/2000 |

OTHER PUBLICATIONS

Japanese Official Action dated Sep. 15, 2009 with an English language translation.

United States Official Action dated Feb. 8, 2012 from related U.S. Appl. No. 12/261,496.

Notice of Allowance dated Jul. 23, 2012 from related U.S. Appl. No. 12/261,496.

* cited by examiner

COORDINATES ON SECOND TRANSFORMED IMAGE → COORDINATES ON TRANSFORMED IMAGE STORING MEMORY

IN STATE WHERE TARGET FIGURE IS
LOCATED ONE PARALLELOGRAM AWAY
FROM ORIGINATION FIGURE TO THE LEFT

IN STATE WHERE TARGET FIGURE IS
LOCATED TWO PARALLELOGRAMS AWAY
FROM ORIGINATION FIGURE TO THE LEFT

COORDINATES ON SECOND TRANSFORMED IMAGE

COORDINATES ON TRANSFORMED IMAGE STORING MEMORY

IMAGE PROCESSING METHOD FOR FAST FILL-IN OF A FIGURE AND COMPUTER READABLE MEDIUM THEREFOR

CROSS-REFERENCE TO RELATED APPLICATION

This application is a divisional application of U.S. application Ser. No. 12/261,496 filed on Oct. 30, 2008, which claims benefit of Japanese Patent Application No. 2007-283215 filed on Oct. 31, 2007, the contents of which are incorporated by reference.

BACKGROUND

1. Technical Field

The following description relates to one or more techniques to attain fast image processing.

2. Related Art

So far, processing and editing of an image have widely been performed. In addition, an image processed and edited is sometimes used as a design of a homepage or a printed T-shirt. Further, an image processing technique to fill in a predetermined area of an image has been known. For example, Japanese Patent Provisional Publication No. HEI8-44881 discloses an image processing technique to fill in a quadrate area.

SUMMARY

Various methods have been proposed for processing and editing of an image. For instance, as shown in FIG. 1, by performing coordinate transformation for a rectangular image 11 using a two-dimensional matrix, a rhomboid image 12 can be newly created. Further, by filling a star-shaped FIG. 13 with the rhomboid images 12 created, a new image 14 can be generated. Namely, it is possible to create a new image by using an image (the rectangular image 11 illustrated in FIG. 1), a transformation matrix (the two-dimensional matrix indicated in FIG. 1), and a figure (the star-shaped FIG. 13 shown in FIG. 1) as input information.

Here, generating the new image 14, as illustrated in FIG. 2, needs image processing to fill in an area of the star-shaped FIG. 13 with a plurality of rhomboid images 12. Additionally, it is necessary for the image processing to secure a two-dimensional memory space in a predetermined storage area (e.g., a RAM) and manage the rhomboid image 12 in the memory space secured. At this time, as shown in FIG. 3, since partial areas (shaded areas in FIG. 3) in the memory space have therein no pixels of the rhomboid image 12, the memory space is not used so efficiently. Additionally, as illustrated in FIG. 3, horizontal widths of the pixels constituting the rhomboid image 12 in the memory space are not constant. Therefore, every horizontal pixel segment of the rhomboid image 12 is required to be managed, and thus it makes the image processing complicated.

Additionally, the process to fill in the area of the star-shaped FIG. 13 with the plurality of rhomboid images 12 is achieved through attaching the rhomboid images 12 within the star-shaped FIG. 13 on a piece-by-piece basis (see FIG. 2). It is necessary for this process to determine a location in which each rhomboid image 12 is to be attached. Thus, it makes the image processing more complicated. Furthermore, in order to attain the process, it is required to copy a pixel value in each address of a two-dimensional memory space (a read memory space) in which the rhomboid image 12 is stored into corresponding coordinates on a memory space (a write memory space) secured for the star-shaped FIG. 13 (the new image 14). Namely, needed is a process to associate each pair of coordinate values in the write memory space with corresponding pair of coordinate values in the read memory space. It might make the image processing further complicated.

Aspects of the present invention are advantageous to provide one or more improved image processing methods and computer readable media therefor that make it possible to fast fill in a figure of a desired shape with intended images.

According to aspects of the present invention, an image processing method is provided, which includes an image acquiring step of acquiring a first two-dimensional parallelogram image constituted by a plurality of pixels, an image creating step of creating a second two-dimensional parallelogram image by dividing the first image into two figures by a line parallel to a predetermined scanning direction and joining together respective sides of the two figures that correspond to an upper base and a lower base of the first image, a calculating step of calculating values w and h, the value w representing a numerical number of pixels constituting one of an upper base and a lower base of the second image, the value h representing a numerical number of pixels aligned in a height direction of the second image, a memory space securing step of securing a w h two-dimensional memory space, a writing step of writing pixel values on each scanning line of the second image, sequentially in a scanning order, onto a corresponding scanning line of the two-dimensional memory space, and a storing step of storing supplementary information of the second image in association with the two-dimensional memory space, the supplementary information including the values w and h, a gradient Δd of the second image, and next line information t representing a positional deviation between a scanning line and a next scanning line to be scanned subsequently to the scanning line.

In some aspects of the present invention, an operation of writing pixel values into a memory space for creating a new image is achieved by reading out pixel values on the two-dimensional memory space in the scanning order as well as using the supplementary information. Therefore, it is possible to perform such a writing operation fast. Additionally, in some aspects of the present invention, by performing the aforementioned image creating step, calculating step, and memory space securing step, it is possible to manage the second two-dimensional parallelogram image on the two-dimensional memory space with high memory usage efficiency.

According to aspects of the present invention, further provided is an image processing method to process a first two-dimensional image stored on a first two-dimensional memory space, which includes an image acquiring step of acquiring a second two-dimensional image to be filled with the first images, a memory securing step of securing a second two-dimensional memory space to express the second image thereon, a reading step of repeatedly performing first and second steps to read out pixel values constituting the first image, the first step being a step in which pixel values on a scanning line of the first image are read out sequentially in a scanning order from the first two-dimensional memory space, the second step being a step in which a next scanning line to be scanned subsequently to the scanning line is determined based upon next line information stored as supplementary information on the first two-dimensional memory space when the pixel values on the scanning line are completely read out, and a writing step of writing the pixel values of the first image read out in the reading step, sequentially in an order read out from the first two-dimensional memory space, into predetermined addresses on the second two-dimensional memory space secured in the memory securing step.

In some aspects of the present invention, it is not necessary to calculate a corresponding address on the first two-dimensional memory space for each address on the second two-dimensional memory space to be written with a pixel value of the corresponding address on the first two-dimensional memory space. Therefore, it is possible to achieve fast image processing.

According to aspects of the present invention, further provided a computer readable medium having computer executable instructions stored thereon, which cause a computer to perform an image acquiring step of acquiring a two-dimensional parallelogram image as a first image constituted by a plurality of pixels, an image creating step of creating a two-dimensional parallelogram image as a second image by dividing the first image into two figures by a line parallel to a predetermined scanning direction and joining together respective sides of the two figures that correspond to an upper base and a lower base of the first image, a calculating step of calculating values w and h, the value w representing a numerical number of pixels constituting one of an upper base and a lower base of the second image, the value h representing a numerical number of pixels aligned in a height direction of the second image, a memory space securing step of securing a w h two-dimensional memory space, a writing step of writing pixel values on each scanning line of the second image, sequentially in a scanning order, onto a corresponding scanning line of the two-dimensional memory space, and a storing step of storing supplementary information of the second image in association with the two-dimensional memory space, the supplementary information including the values w and h, a gradient Δd of the second image, and next line information t representing a positional deviation between a scanning line and a next scanning line to be scanned subsequently to the scanning line.

The computer readable medium adopted as above can also provide some effects as mentioned above. Specifically, an operation of writing pixel values into a memory space for creating a new image is achieved by reading out pixel values on the two-dimensional memory space in the scanning order as well as using the supplementary information. Therefore, it is possible to perform such a writing operation fast. Additionally, in some aspects of the present invention, by performing the aforementioned image creating step, calculating step, and memory space securing step, it is possible to manage the second two-dimensional parallelogram image on the two-dimensional memory space with high memory usage efficiency.

According to aspects of the present invention, further provided a computer readable medium having computer readable instructions stored thereon to be executed by a computer with a first two-dimensional memory space secured to store thereon a first two-dimensional image. The instructions causes the computer to perform an image acquiring step of acquiring a second two-dimensional image to be filled, a memory securing step of securing a second two-dimensional memory space to express the second two-dimensional image thereon, a reading step of repeatedly performing first and second steps to read out pixel values constituting the first image, the first step being a step in which pixel values on a scanning line of the first image are read out sequentially in a scanning order from the first two-dimensional memory space, the second step being a step in which a next scanning line to be scanned subsequently to the scanning line is determined based upon next line information stored as supplementary information on the first two-dimensional memory space when the pixel values on the scanning line are completely read out, and a writing step of writing the pixel values of the first image read out in the reading step, sequentially in an order read out from the first two-dimensional memory space, into predetermined addresses on the second two-dimensional memory space secured in the memory securing step.

The computer readable medium adopted as above can also provide some effects as mentioned above. Specifically, it is not necessary to calculate a corresponding address on the first two-dimensional memory space for each address on the second two-dimensional memory space to be written with a pixel value of the corresponding address on the first two-dimensional memory space. Therefore, it is possible to achieve fast image processing.

BRIEF DESCRIPTION OF THE ACCOMPANYING DRAWINGS

FIG. 1 schematically shows an operation of filling figure data using parameters of an original image, a transformation matrix, and figure data.

FIG. 2 schematically shows how a transformed image is bedded within the figure data.

FIG. 3 schematically shows a state in which the transformed image is stored on a two-dimensional memory space.

Figure 6:
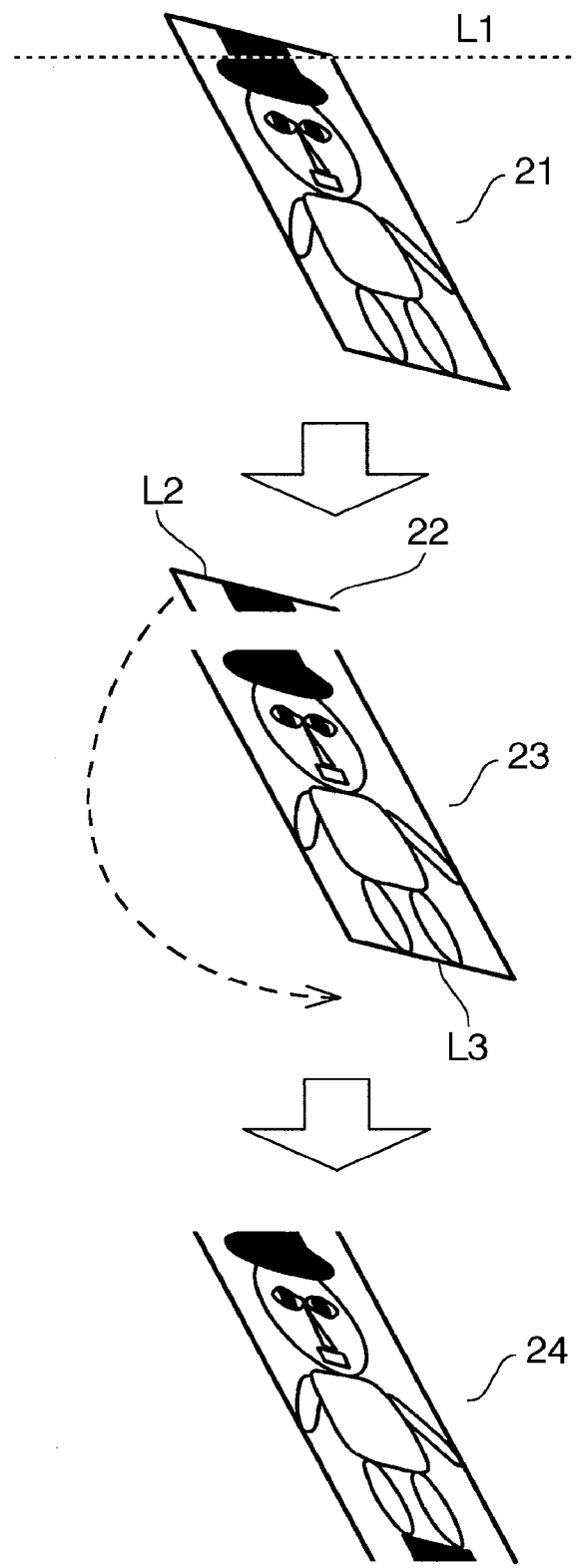

FIG. 6 schematically shows how a second transformed image is generated from a first transformed image in the embodiment according to one or more aspects of the present invention.

Figure 7:
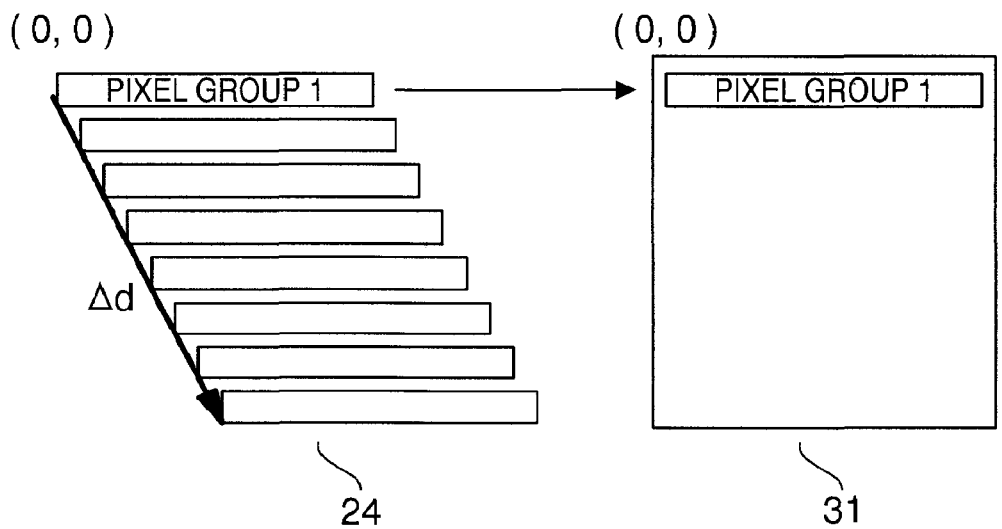

FIG. 7 schematically shows a correspondence relationship between coordinates on the second transformed image and coordinates on a transformed image storing memory in the embodiment according to one or more aspects of the present invention.

Figure 8:
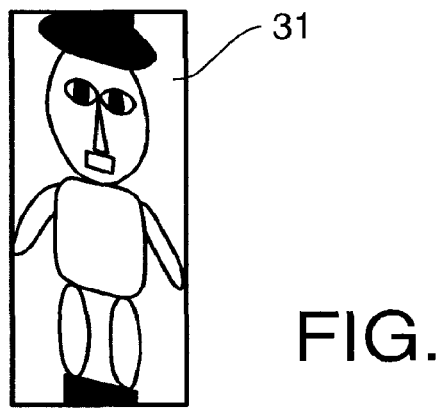

FIG. 8 schematically shows a state in which the second transformed image is stored on the transformed image storing memory in the embodiment according to one or more aspects of the present invention.

Figure 9:
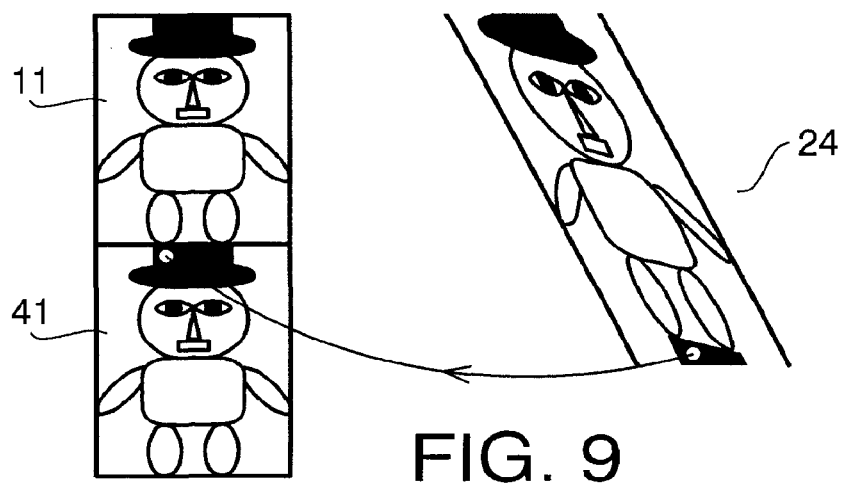

FIG. 9 schematically shows a correspondence relationship between coordinates on the second transformed image and coordinates on the original image in the embodiment according to one or more aspects of the present invention.

Figure 10:
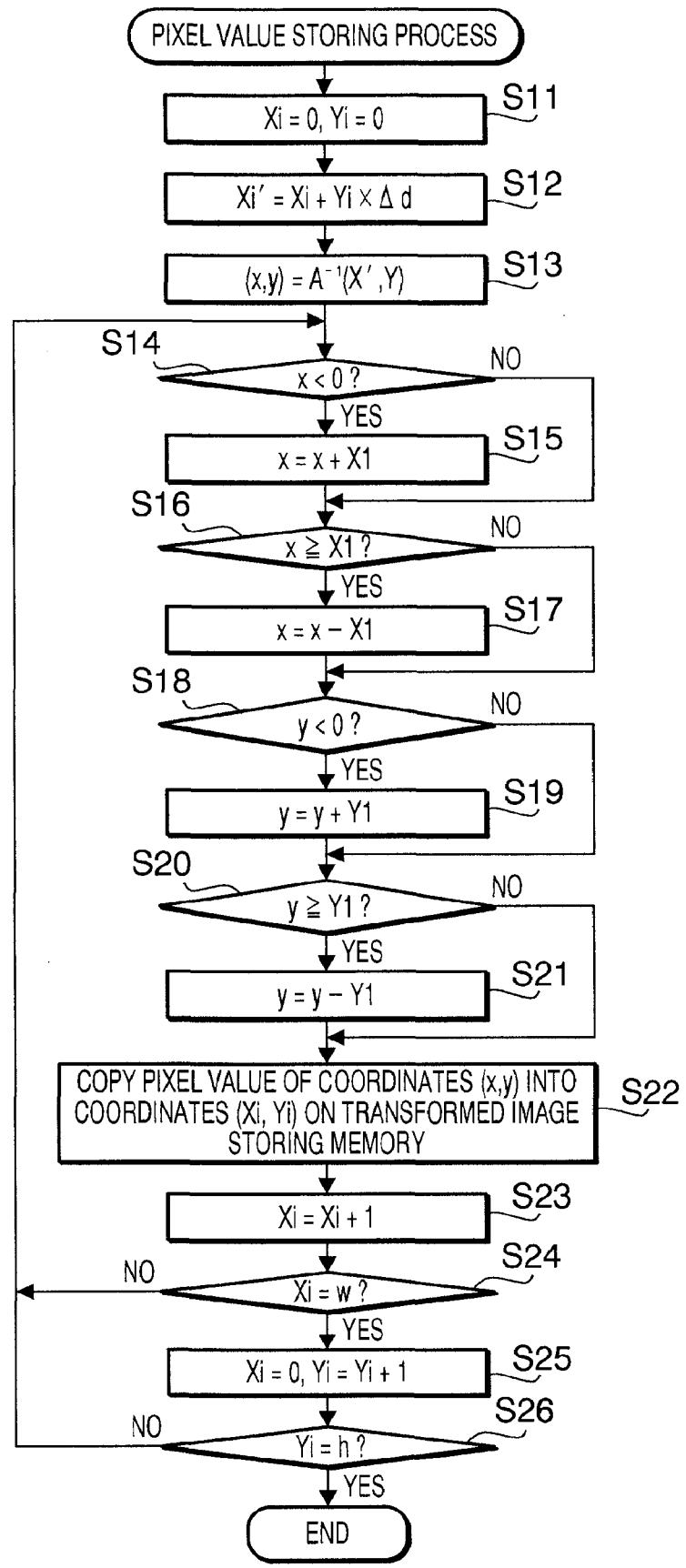

FIG. 10 is a flowchart showing a procedure of a pixel value storing process in the embodiment according to one or more aspects of the present invention.

Figure 11:
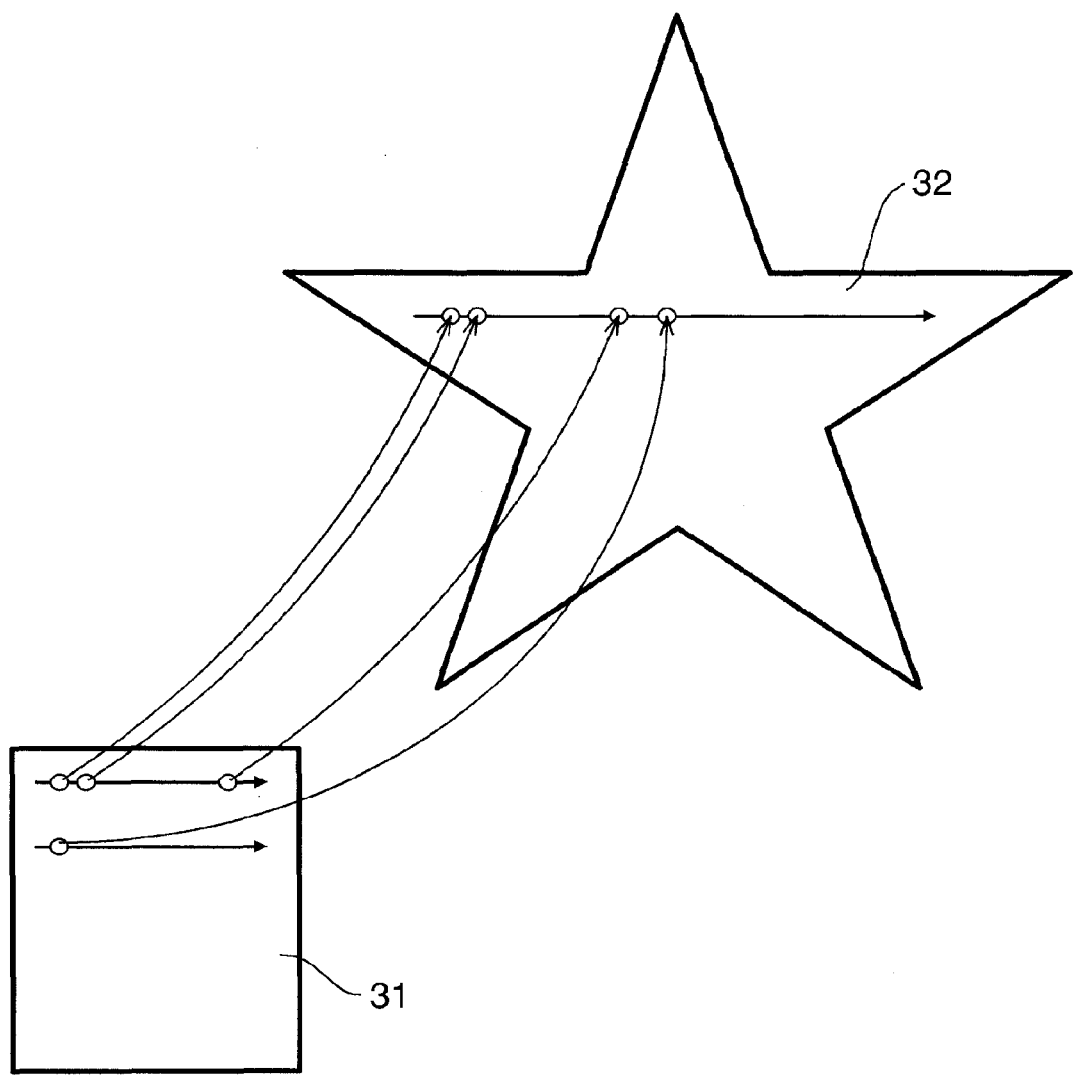

FIG. 11 schematically shows how pixel values on the transformed image storing memory are copied onto a figure data storing memory in the embodiment according to one or more aspects of the present invention.

Figure 12:
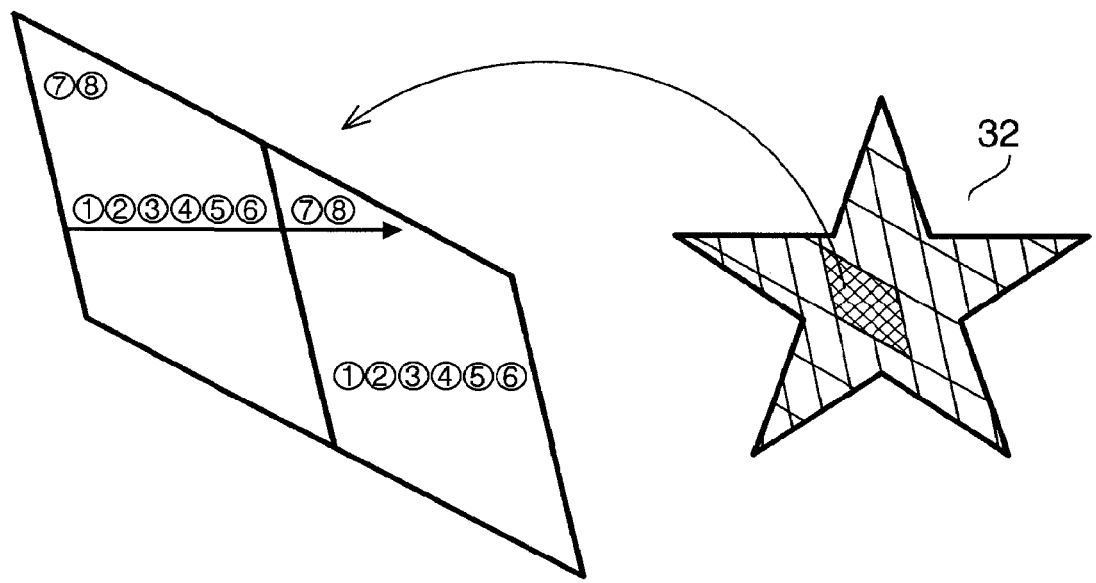

FIG. 12 schematically shows a relationship between pixel values on the figure data storing memory and pixel values on the first transformed image in the embodiment according to one or more aspects of the present invention.

Figure 13:
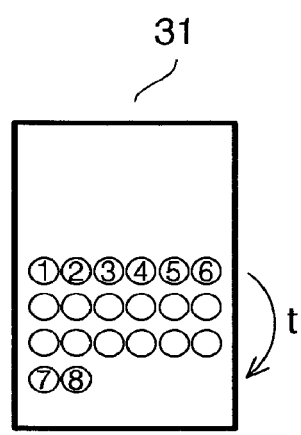

FIG. 13 schematically shows an order in which the pixel values on the transformed image storing memory are read out in the embodiment according to one or more aspects of the present invention.

Figure 14:
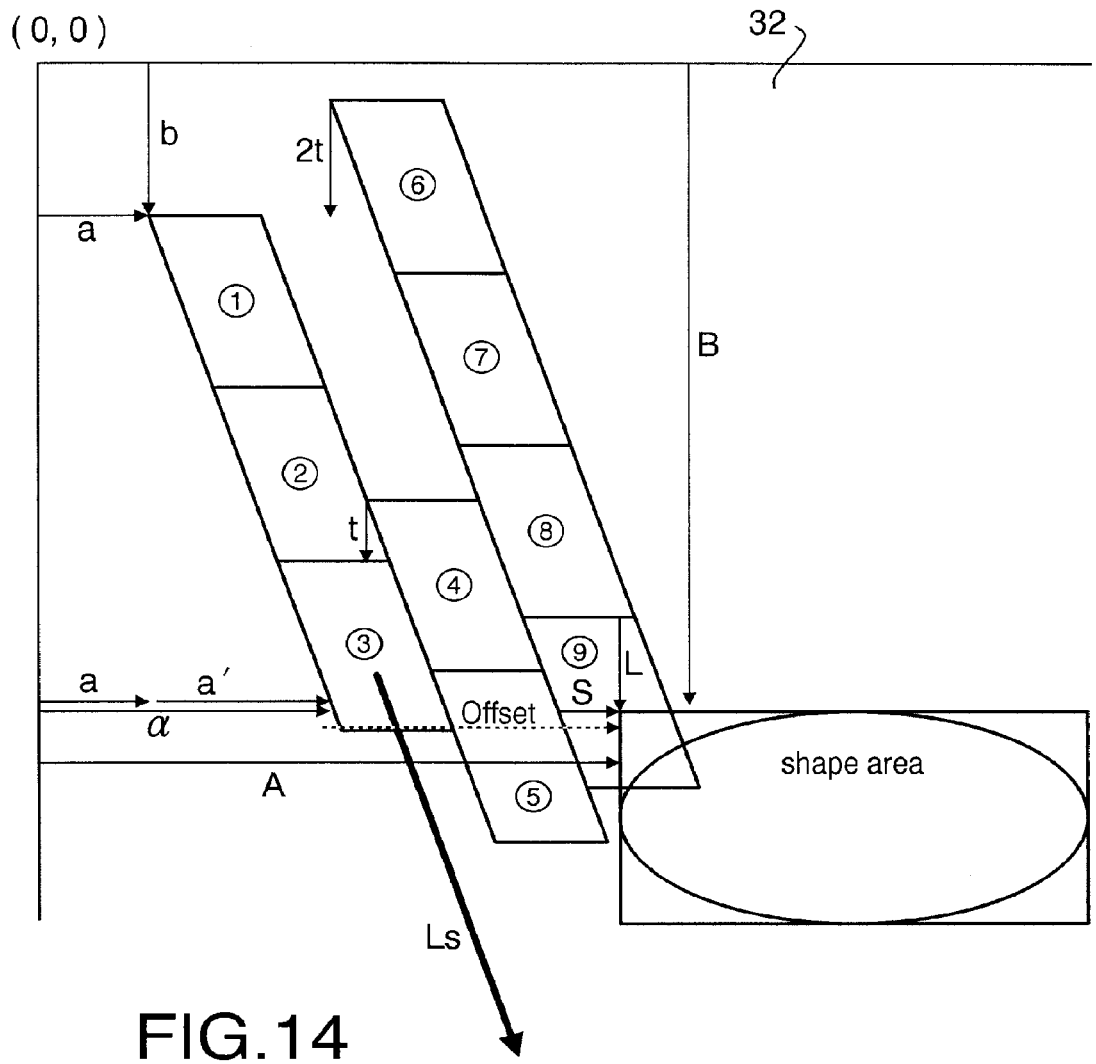

FIG. 14 schematically shows a relationship between a reading start point on the transformed image storing memory and a filling start point on the figure data storing memory in the embodiment according to one or more aspects of the present invention.

Figure 15:
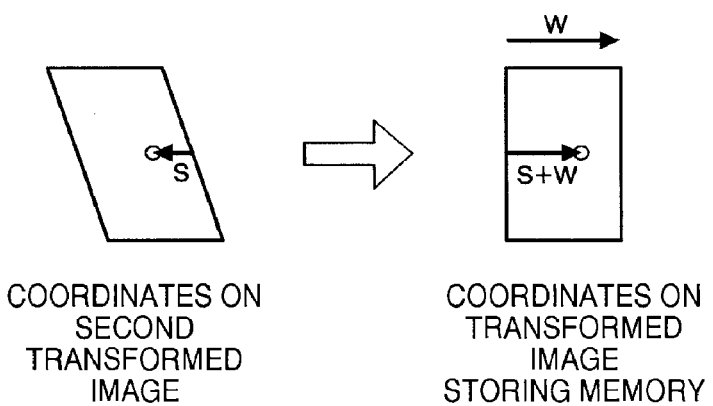

FIG. 15 schematically shows how coordinates on the second transformed image is transformed to coordinates on the transformed image storing memory in the embodiment according to one or more aspects of the present invention.

Figure 16:
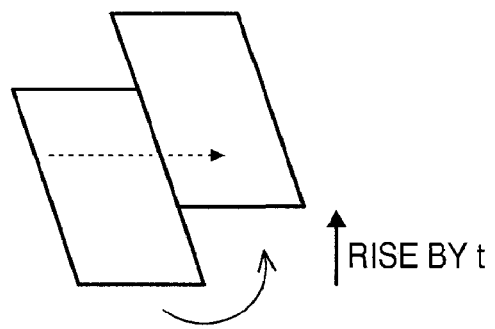

FIG. 16 schematically shows a positional deviation in a vertical direction between second transformed images adjacent in a horizontal direction in the embodiment according to one or more aspects of the present invention.

Figure 17:
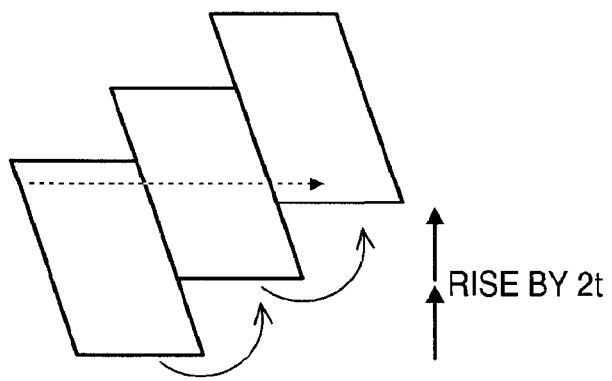

FIG. 17 schematically shows a positional deviation in the vertical direction between second transformed images aligned in the horizontal direction in the embodiment according to one or more aspects of the present invention.

Figure 18:
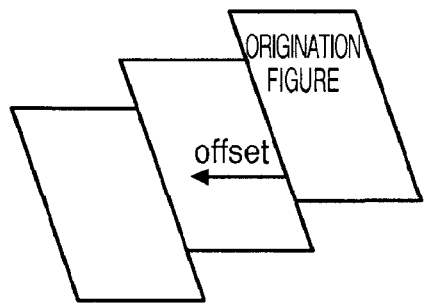

FIG. 18 schematically shows a relationship between Offset and a positional deviation of a target figure from an origination figure in the embodiment according to one or more aspects of the present invention.

Figure 19:
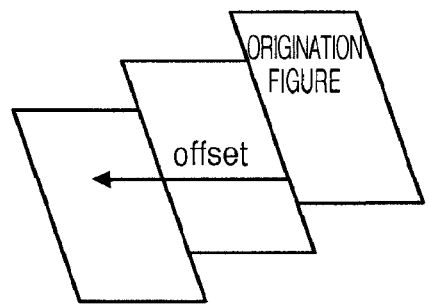

FIG. 19 schematically shows a relationship between Offset and a positional deviation of a target figure from the origination figure in the embodiment according to one or more aspects of the present invention.

Figure 20:
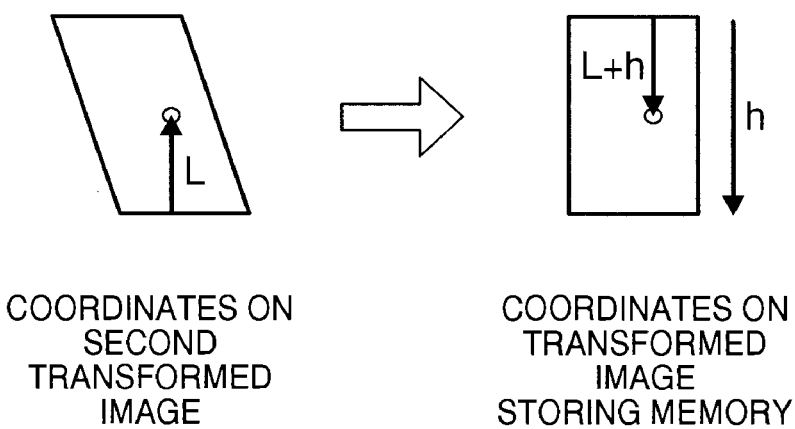

FIG. 20 schematically shows how coordinates on the second transformed image is transformed to coordinates on the transformed image storing memory in the embodiment according to one or more aspects of the present invention.

Figure 21:
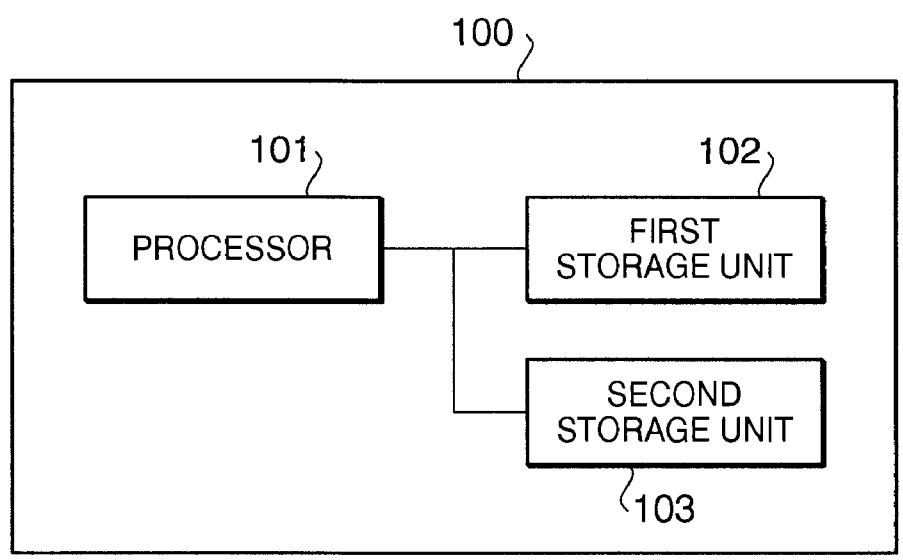

FIG. 21 is a block diagram schematically showing a configuration of an image processing system in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an image processing system of an embodiment according to aspects of the present invention will be described with reference to the accompanying drawings. FIG. 21 is a block diagram schematically showing a configuration of an image processing system 100 in an embodiment. The image processing system 100 of the embodiment includes a processor 101, a first storage unit 102, and a second storage unit 103.

For example, the first storage unit 102 includes a non-volatile memory and/or a magnetic disk drive, In addition, the first storage unit 102 stores thereon an image processing program and an image file (details of them will be described below). Further, the first storage unit 102 also stores thereon various data required for attaining the present invention. The second storage unit 103 includes a volatile memory. Further, programs (including the aforementioned image processing program) and data (including the aforementioned image file) that are stored on the first storage unit 102 are loaded into the second storage unit 103. The processor 101 is configured to perform various processes with data stored on the first storage unit 102 and the second storage unit 103. In the present embodiment, the processor 101 executes the aforementioned image processing program. In addition, the image processing system 100 of the present embodiment may include an input unit configured to accept therethrough inputs of the various data required for attaining the present invention, without having to store the various data on the first storage unit 102.

The aforementioned image processing system 100 provided with the processor 101, the first storage unit 102, and the second storage unit 103 may be configured as a known PC. In this case, for example, a CPU serves as the processor 101, an HDD serves as the first storage unit 102, and a RAM serves as the second storage unit 103. Additionally, the image processing system 100 may be configured with a processor and/or a storage unit dedicated to image processing. Further, the image processing system 100 may be configured with a processor and a storage unit included in a printer. Furthermore, the image processing program may be executed by decentralized processing. In this case, a network technology may be employed therefor.

In the following description, a term "two-dimensional memory space" will be used. The two-dimensional memory space represents a memory space in which a predetermined address is specified with two-dimensional coordinates.

Hereinafter, the image processing program of the present embodiment will be described. The image processing program includes a program configured to cause a computer to execute a transformed image storing process and a program configured to cause a computer to execute a filled image creating process. The above two programs may be executed consecutively as a series of processes. Further, the transformed image storing process and the filled image creating process may be executed by respective separate processors. Further, for example, data generated by the transformed image storing process may be used for another device to execute the filled image creating process.

[Transformed Image Storing Process]

Figure 4:
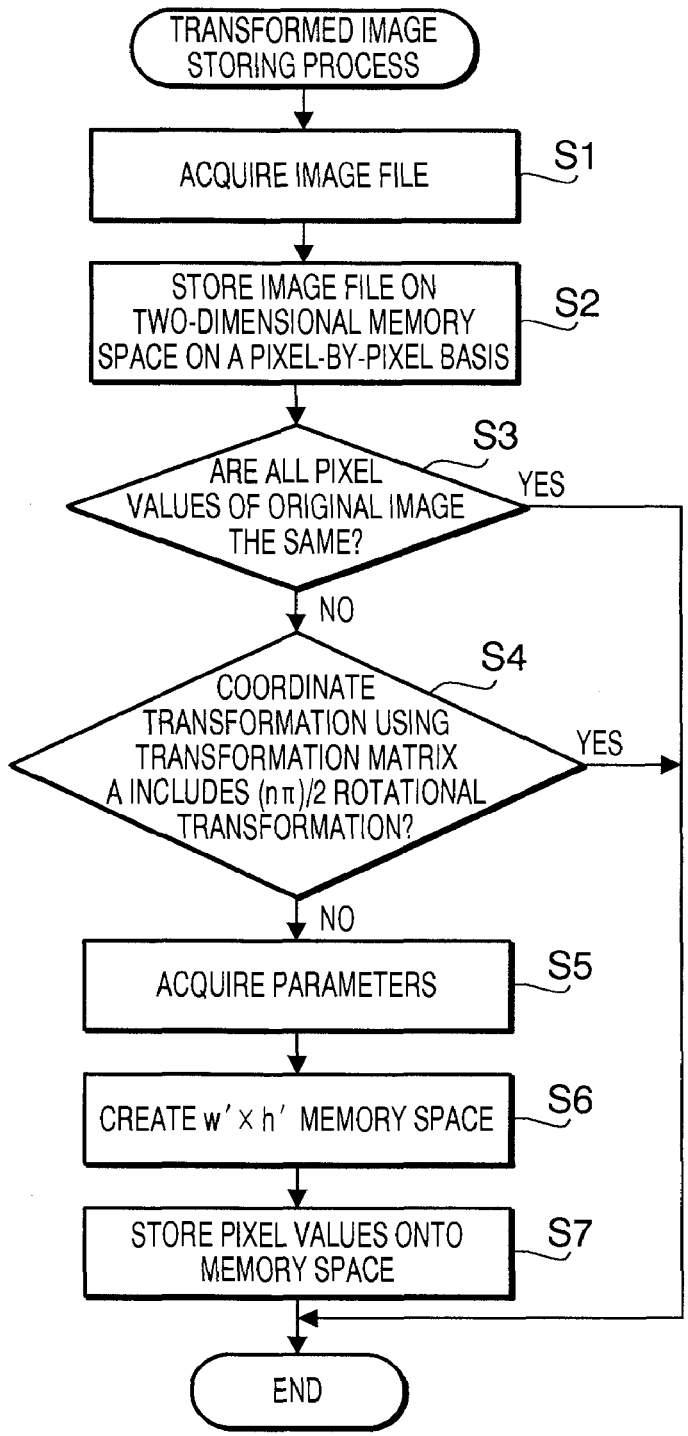
FIG. 4 is a flowchart showing a procedure of a transformed image storing process in an embodiment according to one or more aspects of the present invention.

Firstly, the transformed image storing process will be explained. FIG. 4 is a flowchart showing a procedure of the transformed image storing process.

In S1, acquired is an image file to be a base of a pattern image used for a filling operation. The image file is stored, for example, on the first storage unit. Incidentally, the image file may be obtained via a communication line. A file format of the image file may be any kind of file format such as a JPEG format.

In S2, the image file acquired is stored in a two-dimensional memory space on the second storage unit on a pixel-by-pixel basis. For example, a pixel value of each pixel is represented as 24-bit data of 8 bits for each RGB. It is noted that the pixel value may be represented with another parameter and another data amount.

In the present embodiment, an image stored in the two-dimensional memory space is in a rectangular shape. When an image of the image file acquired is not a rectangular one, a rectangular image is cut out from the acquired image and stored in the two-dimensional memory space. Hereinafter, the image stored in the two-dimensional memory will be referred to as an original image. Further, the two-dimensional memory space to store therein the original image will be referred to as an original image storing memory.

In S3, it is determined whether all pixel values of the original image are identical. When all pixel values are identical (S3: Yes), the original image is regarded as an all one color image. In this case, a single pixel value of the original image has only to be copied for pixel values within a figure to be filled in. Therefore, below-mentioned steps are unnecessary. Here, it is possible to determine whether all pixel values of the original image are identical by storing a pixel value of coordinates to start scanning of the original image and examining whether the all pixel values of the original image are identical to the stored pixel value.

When it is determined that all pixel values are identical (S3: Yes), the transformed image storing process is terminated. Meanwhile, when it is determined that all pixel values are not identical (S3: No), the present process advances to S4. It is noted that the step S3 can be omitted if required. Namely, the below-mentioned steps can be executed regardless of whether all pixel values are identical.

In S4, it is determined whether coordinate transformation using a transformation matrix A for transforming the original image includes rotational transformation of $(n\pi)/2$ [rad]. The transformation matrix A is a two-dimensional affine transformation matrix. In the case of the rotational transformation of $(n\pi)/2$ [rad], since the image to be transformed has a rectangular shape, a known process can be used, and below-mentioned steps do not have to be performed. In this regard, however, the step S4 can be omitted if required. Namely, regardless of the shape of the image to be transformed, the below-mentioned steps may be executed.

When it is determined that the coordinate transformation using the transformation matrix A includes the rotational transformation of $(n\pi)/2$ [rad] (S4: Yes), the transformed image storing process is terminated. Meanwhile, when it is determined that the coordinate transformation using the transformation matrix A does not include the rotational transformation of $(n\pi)/2$ [rad] (S4: No), the present process advances to S5.

Figure 5:
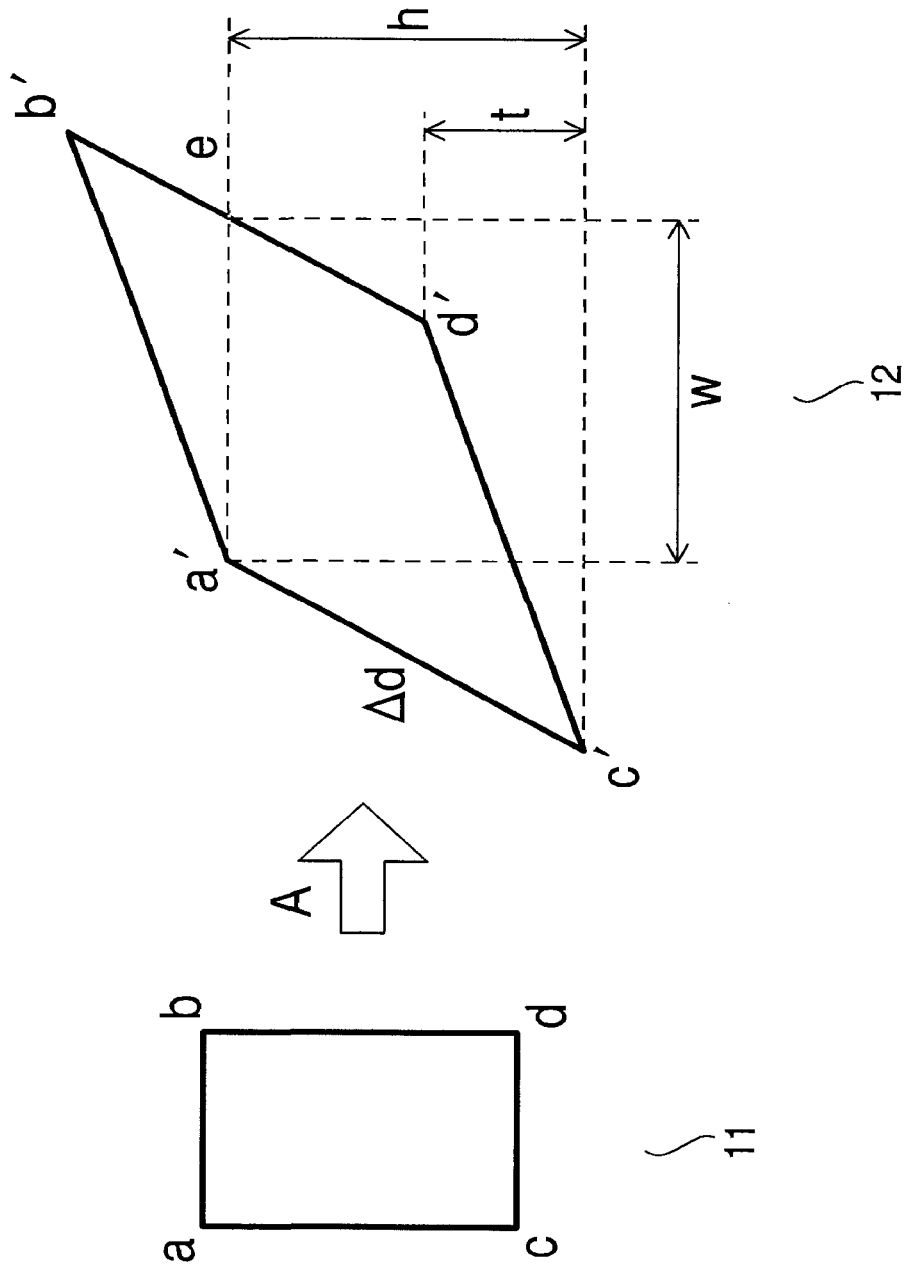
FIG. 5 is a schematic diagram showing a relationship between a shape of an original image and a shape of a transformed image in the embodiment according to one or more aspects of the present invention.

In S5, parameters necessary for the filled image creating process are acquired. As shown in FIG. 5, the acquired parameters are parameters w, h, t, and Δd that represent a shape of the transformed image 12 into which the original image 11 is transformed using the transformation matrix A. When points a', c', d', and e of the transformed image 12 are represented by coordinates (Xa', Ya'), (Xc', Yc'), (Xd', Yd'), and (Xe, Ye), respectively, the parameters w, h, and t are expressed as follows:

$$w=Xe-Xa'$$

$$h=Yc'-Ya'$$

$$t=Yc'-Yd'$$

In this respect, however, X coordinate values and Y coordinate values of the points a', c', d', and e may be numerical values including decimal parts. In this case, the aforementioned parameters w, h, and t may also be numerical values including decimal parts. The parameters w and h are base parameters for defining the two-dimensional memory space (managed with positive integers). Therefore, when the parameters w and h are numerical values including decimal parts, respectively, the parameters w and h are converted into positive integers w' and h', respectively. When the parameters w and h are integers, w'=w and h'=h. It is noted that an operation of converting the parameters w and h into integers may be any of rounding down, rounding up, and rounding off. Further, the parameter t does not have to be converted into an integer.

In addition. Δd is determined as follows:

$$\Delta d=(Xc'-Xa')/(Yc'-Ya')$$

Here, Cd may be a numerical value including a decimal part, yet it does not have to be converted into an integer.

The parameters w, h, t, and Δd determined in S5 are stored as supplementary information, in association with a below-mentioned two-dimensional memory space secured in S6. It is noted that the parameters w, h, t, and Δd may be determined in another method other than the aforementioned method.

In S6, a two-dimensional memory space is created with width "w'" (pixels) *height "h'" (pixels) allocated on the second storage unit. Hereinafter, the memory space created in S6 will be referred to as a transformed image storing memory 31.

In S7, pixel values of the transformed image are stored on the transformed image storing memory 31 created in S6. An operation of the step 7 will be described in detail with reference to FIGS. 6 to 9. Hereinafter, an image into the original image is transformed using the transformation matrix A will be referred to as a first transformed image 21.

Firstly, the first transformed image 21 is transformed into a second transformed image 24 (see FIG. 6). Specifically, the first transformed image 21 is sectioned into a FIG. 22 and a FIG. 23 by a straight line L1 parallel to a scanning direction. Then, the FIG. 22 is moved such that a straight line L2 of the FIG. 22 conforms to a straight line L3 of the FIG. 23. In this time, the FIG. 23 may be moved. The straight lines L2 and L3 are an upper base and a lower base of the first transformed image 21 (parallelogram), respectively. By the above operations, the second transformed image 24 can be generated. It is noted that a Y coordinate value is not limited to FIG. 6.

Subsequently, the second transformed image 24 is stored on the transformed image storing memory 31 with Y coordinate values thereof kept as they are (see FIG. 7). Specifically, the second transformed image 24 is sectioned into pixel groups corresponding to respective horizontal lines. Then, the pixel groups are stored on the transformed image storing memory 31 in a state where a horizontal scanning order in each of the pixel groups is kept and where a vertical order of the pixel groups is kept. Namely, the second transformed image 24 is stored on the transformed image storing memory 31 in a state where a gradient Δd of the pixel groups is neglected. It is noted that Δd has already been acquired in S5. FIG. 8 is a schematic diagram showing the second transformed image 24 stored on the transformed image storing memory 31.

In FIG. 7, it is supposed that the second transformed image 24 has its upper left end as origin coordinates, and that the transformed image storing memory 31 has its upper left end as origin coordinates. At this time, a relationship between coordinates (Xm2, Ym2) on the second transformed image and coordinates (Xi, Yi) on the transformed image storing memory 31 is expressed as follows:

$$Xm2=Xi+Yi X \Delta d$$

$$Ym2=Yi$$

Namely, Y coordinate values are the same between the second transformed image 24 and the transformed image storing memory 31. Meanwhile, there is a difference in X coordinate 11 values therebetween, which is determined with ~d and Yi.

Next, detailed explanation regarding determination of pixel values on the transformed image storing memory 31 will be given. A relationship between pixel values of the coordinates (Xm1, Ym1) on the first transformed image 21 and pixel values of coordinates (x, y) on the original image is expressed as follows:

$$(x,y)=A^{-1}(Xm1,Ym1)$$

Namely, it is possible to determine the coordinate values of the original image by multiplying an inverse matrix of the transformation matrix A by the coordinate values of the first transformed image 21.

Subsequently, a relationship between the pixel values of the coordinates (Xm2, Ym2) on the second transformed image and pixel values of coordinates (x, y) on the original image will be described. In the same manner as the first transformed image 21, coordinate values in the FIG. 23 of the second transformed image 24 can be determined as follows:

$$(x,y)=A^{-1}(Xm2,Ym2)$$

Here, it is supposed that the coordinate transformation is performed with an upper left end point in FIG. 6 as an origin. In this regard, however, as illustrated in FIG. 6, since coordinate values of the FIG. 22 are changed in accordance with the movement of the FIG. 22, coordinate transformation has to be performed for the FIG. 22 to maintain consistency with coordinates thereof on the original image. As shown in FIG. 9, under an assumption that there is a virtual original image 41 having the same pixel values as those of the original image 11 beneath the original image 11, it is possible to process all pixel values of the second transformed image 24 in the same manner as the first transformed image 21.

Specifically, in FIG. 9, when the inverse matrix $A^{-1}$ of the transformation matrix is multiplied by an outline point on a black background in the second transformed image 24, the outline point is coordinate-transformed into an area (of the virtual original image 41) outside an area of the actual original image 11. It is noted that a pixel value in coordinates (xv, yv) of the outline point on the virtual original image 41 is the same as that in coordinates (xv, yv−h). In this case, coordinates of the original image that correspond to coordinates (Xm2, Ym2) of the outline point on the second transformed image 24 are determined as follows:

$$A^{-1}(Xm2,Ym2)=(xv,yv)=(x,yv-h)$$

The aforementioned example provides a case where a Y coordinate value inverse-transformed of the second transformed image 24 exceeds a range of the coordinate 12 values of the original image 11 in a positive direction. In addition to such a case, other cases may be possible depending on settings of the position of line L1, the transformation matrix, and the coordinates of the origin. For example, the Y coordinate value inverse-transformed of the second transformed image 24 may exceed the range of the coordinate values of the original image 11 in a negative direction. Further, an X coordinate value inverse-transformed of the second transformed image 24 may exceed the range of the coordinate values of the original image 11 in a positive or negative direction. Assuming such cases, a relationship between the coordinates Xm2, Ym2) of the second transformed image 24 and the coordinates (x, y) of the original image 21 can be determined as follows:

$$(x,y)=A^{-1}(Xm2,Ym2)$$

when x<0, x=X+X1
when x≧X1, x=x−X1
when y<0, y=y+Y1
when y≧Y1, y=y−y1 where X1 and Y1 represent the number of pixels in a width direction and the number of pixels in a height direction.

As described above, the relationship between the coordinates (Xm2, Ym2) of the second transformed image 24 and the coordinates (Xi, Yi) on the transformed image storing memory 31 is expressed as follows:

$$Xm2=Xi+Yi\times\Delta d$$

$$Ym2=Yi$$

Therefore, a relationship between the coordinates (Xi, Yi) on the transformed image storing memory 31 and the coordinates (x, y) of the original image 21 is determined as follows:

$$(x,y)=A^{-1}(Xm2,Yi)$$

$$Xm2=Xi+Yi\times\Delta d$$

when x<0, x=x+X1
when x≧X1, x=x−X1
when y<0, y=y+Y1
when y≧Y1, y1=y−Y1

It is noted that the value of x and the value of y determined by the above expression may include decimal parts. In such a case, the coordinate values of the original image 21, which are positive integers, can be determined by a known interpolation technique, based upon pixel values of coordinates around the decimal numbers determined. In addition, the value of x and the value of y may simply be converted into integers.

The aforementioned operation of storing the pixel values into the transformed image memory 31 can be attained through a process (a pixel value storing process) shown in a flowchart of FIG. 10. Detailed explanation of the pixel value storing process will be omitted.

The pixel values stored on the transformed image storing memory 31 as above are employed in the below-mentioned filled image creating process. Further, the pixel values on the transformed image storing memory 31, which have been created in the transformed image storing process, may be saved as a file, and the saved file may be executed in another process.

[Filled Image Creating Process]

Hereinafter, the filled image creating process will be described. In the following description, it is supposed that a memory space for creating a filled image therein is secured. In addition, the memory space will sometimes be referred to as a figure data storing memory 32.

As illustrated in FIG. 11, pixel values are written into the figure data storing memory 32 in sequence in a predetermined scanning direction. At this time, the pixel values, which are source data to be written, are read out, in a predetermined scanning direction, from the transformed image storing memory 31. Additionally, when the pixel values are read out up to an end of a predetermined line on the transformed image storing memory 31, a line to be read out next is determined based upon next line information t. Specifically, when the pixel values are read out up to an end of a predetermined line in the two-dimensional memory, a line away from the predetermined line by an amount represented by next line information "t" is read out. It is noted that a value of "t" varies depending on a value of Δd. In the following description, for the sake of descriptive convenience, it is supposed that "t" is a positive integer. In this regard, however, the same process as described below can be applied even though "t" is not a positive integer.

Figure 1:
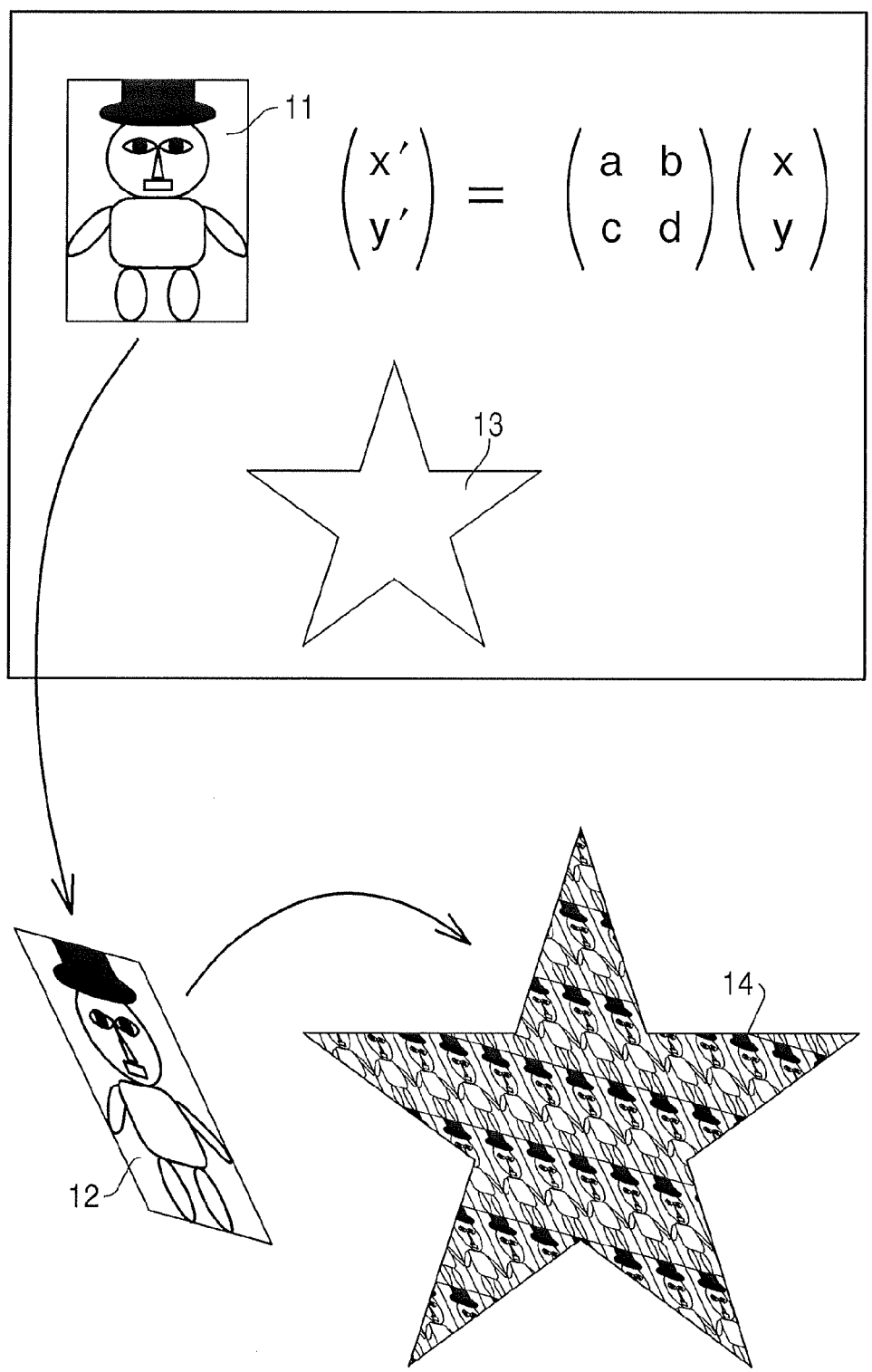
Figure 2:
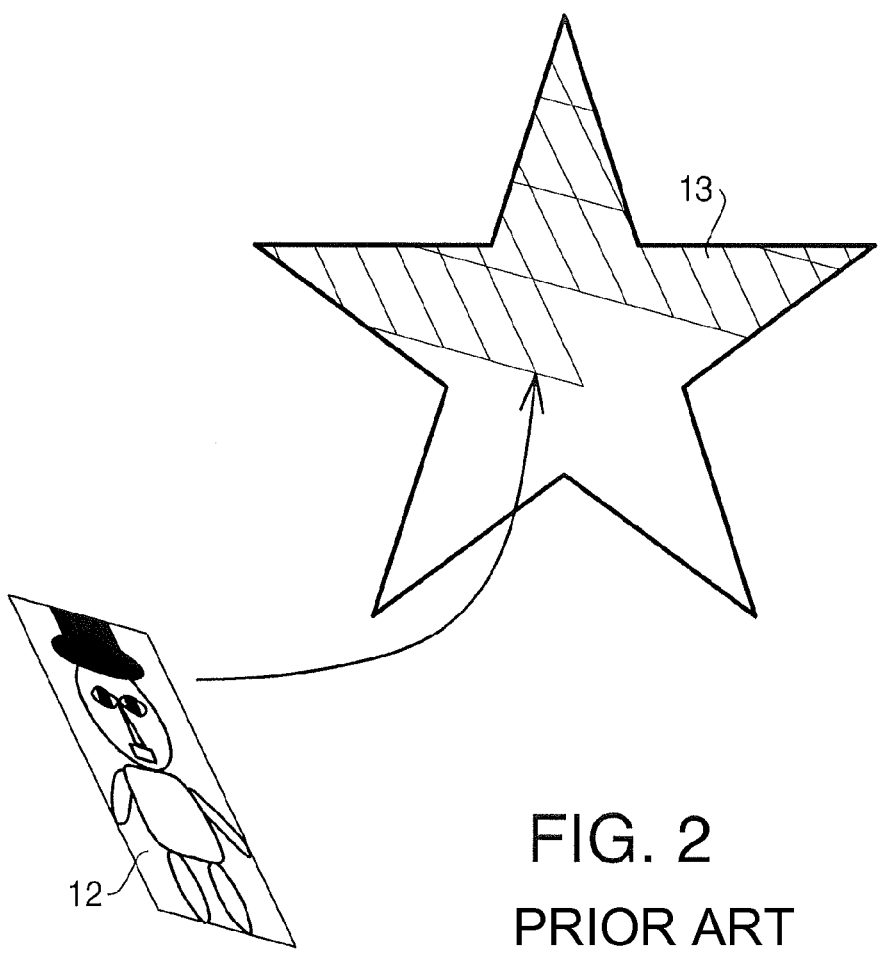
Figure 3:
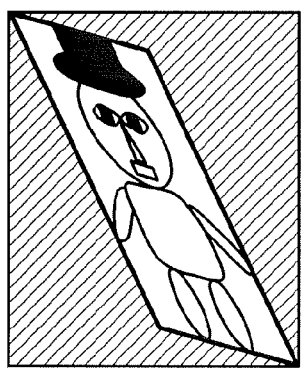

Hereinafter, concrete explanation of the process will be given. On a conceptual basis, as illustrated in FIG. 2, in the process, figure data is paved with the first transformed images. FIG. 12 shows an alignment sequence of the first transformed images attached within the figure image 13. FIG. 13 shows an alignment sequence of the pixels on the transformed image storing memory 31. As illustrated in FIGS. 12 and 13, a pixel (6) is read out, and subsequently a pixel (7) is read out. In addition, when the parameters t, w, and h are numerical values including decimal parts, it is possible to more reduce an error in each reading start point by sequentially making a calculation using the parameters t, w, and h including decimal parts as they are and setting an integer part of a value calculated at each of different times as a value of the reading start point, than by converting the parameters t, w, and h including decimal parts into positive integers, then sequentially making a calculation, and setting a calculated value as a value of the reading start point. In addition, the reading start point may be determined by an interpolation technique based upon coordinate values including decimal parts. At this time, the reading start point may be determined based upon coordinate values the closest to the above coordinate values on the transformed image memory 31. Further, the reading start point may be determined as a weighted average based upon a plurality of pixels near the above coordinate values on the transformed image storing memory 31. In order to determine a highly accurate reading start point, it is more desired to make a calculation using values including decimal parts as they are.

Here, the pixel (7) is located "t" lines below the pixel (6) on the transformed image storing memory 31. When a line number of the pixel (6) is assumed to be "c" a line number of a line to be next read out is (c+t). When (c+t) is equal to or more than "h," a line number of a line to be next read out is determined as (c+t−h). In the aforementioned process, it is possible to simplify a correspondence relationship between an address on the transformed image storing memory 31 from which data is read out and an address on the figure data storing memory 32 into which the data is written. Thereby, as shown in FIG. 11, it is possible to achieve a fast operation of writing the pixel values in the scanning order into the figure data storing memory 32.

The following description will provide explanation of a method to determine the reading start point on the transformed image storing memory 31 when a pixel value is written onto each scanning line. In the present embodiment, for each scanning line, there is determined a reading start point on the transformed image storing memory 31 corresponding to a writing start point on the figure data storing memory 32.

A concrete process will be described with reference to FIG. 14. Here, it is supposed that an upper left end point in FIG. 14 represents start point coordinates, and that a shape area is to be filled. Further, a rectangular area tangent to the shape area is specified as a target area to be filled. Additionally, pixel values read out from the transformed image storing memory 31 are not written into areas other than the shape area within the target area to be filled.

Hereinafter, for the sake of descriptive convenience, it is supposed that the shape area is paved with the second transformed images. Origination coordinates of the second transformed image on the figure data storing memory 32 are defined as (a, b). Further, origination coordinates of the target area to be filled on the figure data storing memory 32 are defined as (A, B).

In this process, on a conceptual basis, the second transformed images (hereinafter, which may be referred to as parallelograms) are bedded with (a, b) as an origination, and a parallelogram (hereinafter, which may be referred to as a target parallelogram) that includes therein coordinates of a filling start point (in this case, (A, B)) is specified. Then, coordinates (S, L) relative to an upper end and a left end of the target parallelogram are determined. In FIG. 14, the target parallelogram is a parallelogram (9).

Here, S and L are equivalent to coordinate values on the transformed image storing memory 31. Therefore, when S and L are determined, a pixel of coordinates (S, L) on the transformed image storing memory 31 is determined as a reading start point corresponding to the filling start point.

Explanation of a method to determine S will be given. First, a parallelogram (1) is placed with (a, b) as an origination.

Next, a parallelogram (2) is placed such that an upper base thereof conforms to a lower base of the parallelogram (1). Subsequently, a parallelogram (3) is placed such that an upper base thereof conforms to a lower base of the parallelogram (2). In the same way, parallelograms are placed in sequence, and a parallelogram of which Y coordinate values include B is specified. Hereinafter, the specified parallelogram may be referred to as an origination figure. In FIG. 14, the parallelogram (3) is specified as the origination figure.

Thereafter, a left end point of the parallelogram (3) on a line of which a Y coordinate value is equal to B is specified. Then, an X coordinate value a of a point located to an immediate left of the specified left end point is determined. At this time, a is expressed as follows:

$$\alpha = a + a'$$

Further, a' is expressed as follows:

$$a' = (B−b) \times \Delta d$$

Therefore, a can be written as follows:

$$\alpha = a + (B−b) \times \Delta d$$

Here, although a may be a numerical value including a decimal part, a does not have to be converted into an integer. Incidentally, a may be converted into an integer as needed.

Subsequently, Offset is determined with a following expression.

$$\text{Offset} = A − \alpha$$

As illustrated in FIG. 14, it is understood that S is produced by subtracting the widths w of parallelograms (3) and (5) from Offset. Namely, in FIG. 14, Offset is expressed as follows:

$$\text{Offset} = 2 \times w + S$$

To generalize it, the target parallelogram is located "X" parallelograms away from the origination figure. When a width of a parallelogram is "w," Offset is written by a following general expression.

$$\text{Offset} = X \times w + S$$

In the case of the parallelogram (3), X=1. Further, in the case of the parallelogram (5), X=2. From the above expression, S can be written as follows:

$$S = \text{Offset} − X \times w$$

This expression represents a surplus when Offset is divided by "w." Therefore, S can also be expressed as follows:

$$S = \text{Offset} \% \, w \, (m \% n \text{ represents a surplus when } m \text{ is divided by } n)$$

Depending on a shape of the second transformed image, a setting of the origination (a, b), and a setting of the origin, S may be a negative value. In this case, in order for transformation into a coordinate system of the transformed image storing memory 31, S is modified by a following operation.

$$S = S + w$$

In this operation, a right-pointing vector w is added to a left-pointing vector S. Thereby, coordinates on the second transformed image can be transformed into coordinates on the transformed image storing memory (see FIG. 15).

In the above operation, the determined S may be a numerical value including a decimal part. In this case, an integer S' into which S is converted can be determined as an X coordinate value of the reading start point. Further, the X coordinate value of the reading start point is determined by a known interpolation technique based upon pixel values of coordinates around the decimal number as calculated. Explanation of the known interpolation technique will be omitted.

Further, in the above operations, S is determined with a decimal part included therein, and converted into an integer as the X coordinate value of the reading start point. Hence, it is possible to improve accuracy of pixel values written into the figure data storing memory 32. Thus, it is possible to improve quality of a filled image as generated.

Next, explanation of a method to determine L will be given. In FIG. 14, L represents a coordinate value relative to an upper end of the target parallelogram. Accordingly, it is required to obtain a Y coordinate value of the target parallelogram. Regarding a parallelogram (e.g., the parallelogram (2) or (3)) that continues from the parallelogram (1) in a Y axis direction, a following relationship is established.

$$B-b=n\times h+L$$

where n represents that the target parallelogram is located "n" parallelograms away from the parallelogram (1) (in the case of the parallelogram (2), n=1, and in the case of the parallelogram (3), n=2).

Further, regarding a parallelogram (e.g., parallelograms (4) and (8)) located on a right or left side relative to the aforementioned parallelogram, it is needed to consider a deviation in the Y axis direction. Specifically, as shown in FIGS. 16 and 17, when the target parallelogram shifts right by one parallelogram, an upper end of the target parallelogram shifts by "t" toward the origin along the Y axis.

Here, as shown in FIG. 14, a line along which the parallelograms are aligned in an order of the parallelograms (1), (2), and (3) is defined as an origination line Ls. The origination line Ls extends to pass through respective points included in the parallelograms aligned therealong (in the present embodiment, the origination line Ls passes substantially through centers of the parallelograms aligned therealong). Then, it is necessary to determine how many parallelograms ("N" parallelograms) away from the origination line Ls the target parallelogram is located. For instance, when "w" is equal to 10 and Offset is 15, it represents that the target parallelogram is located one parallelogram away from the origination line Ls. It is determined as follows:

$$INT[15/10]=INT[1.5]=1$$

where INT[n] represents an integer part of "n."
Further, when "w" is 10 and Offset is 22, $$INT[22/10]=INT[2.2]=2$$

The above relationship can be generalized as an integer value (omit a decimal part) generated by dividing Offset by "w" as follows:

$$N=INT[Offset/w]$$

Depending on the shape of the second transformed image, the setting of the origination (a, b), and the setting of the origin, Offset may be a negative value. When "w" is equal to 10 and Offset is −8, the target parallelogram is located one parallelogram away from the origination figure toward the origin (see FIG. 18). At this time, N is determined as follows:

$$N=INT[-8/10]=0$$

In addition, when "w" is equal to 10 and Offset is −16, the target parallelogram is located two parallelograms away from the origination figure toward the origin (see FIG. 19). At this time, N is determined as follows:

$$N=INT[46/10]=-1$$

Accordingly, when Offset is a negative value, namely, the target parallelogram is located "N" parallelograms away from the origination figure toward the origin, N is modified by a following operation.

$$N=N-1$$

According to the above description, L can be determined as follows. A Y coordinate value of an upper end of a parallelogram on the origination line Ls is determined as "b+n×h." Therefore, a Y coordinate value of an upper end of the target parallelogram is determined as "b+n×h+t+t×N." Thereby, a relationship between B and L is expressed as follows:

$$B=b+n\times h+t\times N+L$$

The above expression can be rewritten by transposition as follows:

$$L=B-b+t\times N-n\times h$$

The above expression represents a surplus when (B−b+t×N) is divided by h. Hence, the above expression can further be rewritten as follows:

$$L=(B-b+t\times N)\% h$$

Depending on the shape of the second transformed image, the setting of the origination (a, b), and the setting of the origin, L may be a negative value. In this case, in order to transform the coordinates on the second transformed image into the coordinates on the transformed image storing memory 31, L is modified by a following operation.

$$L=L+h$$

The above operation is to add a downward vector h to an upward vector L. Thereby, it is possible to transform the coordinates on the second transformed image into the coordinates on the transformed image storing memory 31 (see FIG. 20).

In the aforementioned operations, L may be a numerical value including a decimal part. In this case, it is possible to determine L' that is an integer into which L is converted, as the Y coordinate value of the reading start point. In addition, the Y coordinate value of the reading start point may be determined by a known interpolation technique, based upon pixel values of coordinates around the decimal numbers determined. Explanation of the known interpolation technique will be omitted.

Further, in the above operations, Y is determined with a decimal part included therein, and converted into an integer as the Y coordinate value of the reading start point. Hence, it is possible to improve accuracy of pixel values written into the figure data storing memory 32. Thus, it is possible to improve the quality of the filled image as generated.

Hereinabove, according to the present embodiment, it is possible to write pixel values in a scanning order into a target figure to be filled. Thus, it is possible to attain a fast filling operation. Additionally, it is possible to use a memory capacity more efficiency.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

The invention claimed is:

1. An image processing method to process a first two-dimensional image stored on a first two-dimensional memory space, comprising:
   an image acquiring step of acquiring a second two-dimensional image to be filled with the first images;
   a memory securing step of securing a second two-dimensional memory space to express the second image thereon;
   a reading step of repeatedly performing first and second steps to read out pixel values constituting the first image, the first step being a step in which pixel values on a scanning line of the first image are read out sequentially in a scanning order from the first two-dimensional memory space, the second step being a step in which a next scanning line to be scanned subsequently to the scanning line is determined based upon next line information stored as supplementary information on the first two-dimensional memory space when the pixel values on the scanning line are completely read out; and
   a writing step of writing the pixel values of the first image read out in the reading step, sequentially in an order read out from the first two-dimensional memory space, into predetermined addresses on the second two-dimensional memory space secured in the memory securing step, such that the second image is filled with at least two of the first image and includes a line containing the pixel values on both the scanning line and the next scanning line read out from the first image.

2. An image processing method to process a first two-dimensional image stored on a first two-dimensional memory space, comprising:
   an image acquiring step of acquiring a second two-dimensional image to be filled with one or more of the first image;
   a memory securing step of securing a second two-dimensional memory space to express the second image thereon;
   a reading step of repeatedly performing first and second steps to read out pixel values constituting the first image, the first step being a step in which pixel values on a scanning line of the first image are read out sequentially in a scanning order from the first two-dimensional memory space, the second step being a step in which a next scanning line to be scanned subsequently to the scanning line is determined based upon next line information stored as supplementary information on the first two-dimensional memory space when the pixel values on the scanning line are completely read out; and
   a writing step of writing the pixel values of the first image read out in the reading step, sequentially in an order read out from the first two-dimensional memory space, into predetermined addresses on the second two-dimensional memory space secured in the memory securing step,
   wherein the supplementary information further includes:
      a value w that represents a numerical number of pixels in a width direction of the first two-dimensional memory space;
      a value h that represents a numerical number of pixels in a height direction of the first two-dimensional memory space; and
      a gradient $\Delta d$ of the first image stored on the first two-dimensional memory space, and
   wherein the reading step includes a step of determining a reading start point on the first two-dimensional memory space for each scanning line on the second two-dimensional memory space, based upon the supplementary information.

3. The image processing method according to claim 2, wherein, when the reading start point as determined on the first two-dimensional memory space is represented by coordinates including a coordinate value that is not a positive integer, the reading step includes a step of converting the coordinate value into an integer.

4. An image processing method to process a first two-dimensional image stored on a first two-dimensional memory space, comprising:
   an image acquiring step of acquiring a second two-dimensional image to be filled with one or more of the first image;
   a memory securing step of securing a second two-dimensional memory space to express the second image thereon;
   a reading step of repeatedly performing first and second steps to read out pixel values constituting the first image, the first step being a step in which pixel values on a scanning line of the first image are read out sequentially in a scanning order from the first two-dimensional memory space, the second step being a step in which a next scanning line to be scanned subsequently to the scanning line is determined based upon next line information stored as supplementary information on the first two-dimensional memory space when the pixel values on the scanning line are completely read out; and
   a writing step of writing the pixel values of the first image read out in the reading step, sequentially in an order read out from the first two-dimensional memory space, into predetermined addresses on the second two-dimensional memory space secured in the memory securing step,
   wherein the supplementary information further includes:
      a value w that represents a numerical number of pixels in a width direction of the first two-dimensional memory space;
      a value h that represents a numerical number of pixels in a height direction of the first two-dimensional memory space; and
      a gradient $\Delta d$ of the first image stored on the first two-dimensional memory space,
   wherein the reading step includes a step of determining a reading start point (S, L) on the first two-dimensional memory space for each scanning line on the second two-dimensional memory space, based upon the supplementary information, and
   wherein, when origination coordinates on the second two-dimensional memory space from which the first images are bedded are defined as (a, b), and origination coordinates on the second two-dimensional memory space from which the second image is filled with the first images are defined as (A, B), $$\alpha = a + (B-b) \times \Delta d$$

$$\text{Offset} = A - \alpha$$

$S = \text{Offset} \% w (m \% n$ represents a surplus when $m$ is divided by $n$)

when S<0, S=S+w $$N = \text{Offset}/w$$

when Offset<0, N=N−1

$$L = (B-b+t \times N) \% h$$

when L<0, L=L+h.

5. A non-transitory computer readable medium having computer readable instructions stored thereon to be executed by a computer with a first two-dimensional memory space secured to store thereon a first two-dimensional image, the instructions causing the computer to perform:
　an image acquiring step of acquiring a second two-dimensional image to be filled;
　a memory securing step of securing a second two-dimensional memory space to express the second two-dimensional image thereon;
　a reading step of repeatedly performing first and second steps to read out pixel values constituting the first image, the first step being a step in which pixel values on a scanning line of the first image are read out sequentially in a scanning order from the first two-dimensional memory space, the second step being a step in which a next scanning line to be scanned subsequently to the scanning line is determined based upon next line information stored as supplementary information on the first two-dimensional memory space when the pixel values on the scanning line are completely read out; and
　a writing step of writing the pixel values of the first image read out in the reading step, sequentially in an order read out from the first two-dimensional memory space, into predetermined addresses on the second two-dimensional memory space secured in the memory securing step, such that the second image is filled with at least two of the first image and includes a line containing the pixel values on both the scanning line and the next scanning line read out from the first image.

6. A non-transitory computer readable medium having computer readable instructions stored thereon to be executed by a computer with a first two-dimensional memory space secured to store thereon a first two-dimensional image, the instructions causing the computer to perform:
　an image acquiring step of acquiring a second two-dimensional image to be filled;
　a memory securing step of securing a second two-dimensional memory space to express the second two-dimensional image thereon;
　a reading step of repeatedly performing first and second steps to read out pixel values constituting the first image, the first step being a step in which pixel values on a scanning line of the first image are read out sequentially in a scanning order from the first two-dimensional memory space, the second step being a step in which a next scanning line to be scanned subsequently to the scanning line is determined based upon next line information stored as supplementary information on the first two-dimensional memory space when the pixel values on the scanning line are completely read out; and
　a writing step of writing the pixel values of the first image read out in the reading step, sequentially in an order read out from the first two-dimensional memory space, into predetermined addresses on the second two-dimensional memory space secured in the memory securing step,
　wherein the supplementary information further includes:
　　a value w that represents a numerical number of pixels in a width direction of the first two-dimensional memory space;
　　a value h that represents a numerical number of pixels in a height direction of the first two-dimensional memory space; and
　　a gradient $\Delta d$ of the first image stored on the first two-dimensional memory space, and wherein the reading step includes a step of determining a reading start point on the first two-dimensional memory space for each scanning line on the second two-dimensional memory space, based upon the supplementary information.

7. The non-transitory computer readable medium according to claim 6,
　wherein, when the reading start point as determined on the first two-dimensional memory space is represented by coordinates including a coordinate value that is not a positive integer, the reading step includes a step of converting the coordinate value into an integer.

8. A non-transitory computer readable medium having computer readable instructions stored thereon to be executed by a computer with a first two-dimensional memory space secured to store thereon a first two-dimensional image, the instructions causing the computer to perform:
　an image acquiring step of acquiring a second two-dimensional image to be filled;
　a memory securing step of securing a second two-dimensional memory space to express the second two-dimensional image thereon;
　a reading step of repeatedly performing first and second steps to read out pixel values constituting the first image, the first step being a step in which pixel values on a scanning line of the first image are read out sequentially in a scanning order from the first two-dimensional memory space, the second step being a step in which a next scanning line to be scanned subsequently to the scanning line is determined based upon next line information stored as supplementary information on the first two-dimensional memory space when the pixel values on the scanning line are completely read out; and
　a writing step of writing the pixel values of the first image read out in the reading step, sequentially in an order read out from the first two-dimensional memory space, into predetermined addresses on the second two-dimensional memory space secured in the memory securing step,
　wherein the supplementary information further includes:
　　a value w that represents a numerical number of pixels in a width direction of the first two-dimensional memory space;
　　a value h that represents a numerical number of pixels in a height direction of the first two-dimensional memory space; and
　　a gradient $\Delta d$ of the first image stored on the first two-dimensional memory space,
　wherein the reading step includes a step of determining a reading start point (S, L) on the first two-dimensional memory space for each scanning line on the second two-dimensional memory space, based upon the supplementary information, and
　wherein, when origination coordinates on the second two-dimensional memory space from which the first images are bedded are defined as (a, b), and origination coordinates on the second two-dimensional memory space from which the second image is filled with the first images are defined as (A, B), $$\alpha = a + (B-b) \times \Delta d$$

$$\text{Offset} = A - \alpha$$

$$S = \text{Offset} \% w \ (m \% n \text{ represents a surplus when } m \text{ is divided by } n)$$

when S<0, S=S+w $$N = \text{Offset}/w$$

when Offset<0, N=N−1

$$L = (B - b + t \times N) \% h$$

when L<0, L=L+h.

\* \* \* \* \*